United States Patent
Olafsson et al.

(10) Patent No.: US 7,062,022 B2
(45) Date of Patent: ***Jun. 13, 2006

(54) METHOD AND APPARATUS FOR FAST V.90 MODEM STARTUP

(75) Inventors: Sverrir Olafsson, Reykjavik (IS); Keith Chu, Laguna Niguel, CA (US); Burk Beadle, Irvine, CA (US)

(73) Assignee: Mindspeed Technologies, Inc., Newport Beach, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/753,570

(22) Filed: Jan. 8, 2004

(65) Prior Publication Data

US 2004/0146148 A1    Jul. 29, 2004

Related U.S. Application Data

(63) Continuation of application No. 09/361,842, filed on Jul. 27, 1999, now Pat. No. 6,819,749.

(60) Provisional application No. 60/128,874, filed on Apr. 12, 1999.

(51) Int. Cl.
*H04M 11/00* (2006.01)

(52) U.S. Cl. ............................. 379/93.32; 379/93.31; 375/222

(58) Field of Classification Search .............. 379/93.01, 379/93.05, 93.06, 93.28, 93.29, 93.3, 93.31, 379/93.32, 93.33, 93.35, 100.17; 375/220, 375/222, 231; 370/252
See application file for complete search history.

(56) References Cited

U.S. PATENT DOCUMENTS

| | | | |
|---|---|---|---|
| 4,578,796 A | 3/1986 | Charalambous et al. | |
| 4,621,366 A | 11/1986 | Cain et al. | |
| 4,847,880 A * | 7/1989 | Kamerman et al. | 375/222 |
| 4,852,151 A | 7/1989 | Dittakavi et al. | |
| 4,894,847 A | 1/1990 | Tjahjadi et al. | |
| 4,995,074 A | 2/1991 | Goldman et al. | |
| 5,127,051 A | 6/1992 | Chan et al. | |
| 5,131,025 A | 7/1992 | Hamasaki | |
| 5,287,401 A | 2/1994 | Lin | |
| 5,317,594 A | 5/1994 | Goldstein | |
| 5,353,280 A | 10/1994 | Ungerbock | |
| 5,367,563 A | 11/1994 | Sainton | |

(Continued)

FOREIGN PATENT DOCUMENTS

EP    0 409 641 A2    1/1991

(Continued)

OTHER PUBLICATIONS

"V.90" Sep. 1998, ITU-T Telecommunication Standardization Sector of ITU, the whole document.

(Continued)

*Primary Examiner*—Melur Ramakrishnaiah
(74) *Attorney, Agent, or Firm*—Farjami & Farjami LLP (57) ABSTRACT

A fast startup procedure for a modem system utilizes known characteristics of a previously established communication channel to reduce the initialization period associated with subsequent connections over the same channel. In response to the establishment of a call, the modem devices determine whether the fast connect protocol is supported. If so, then the called modem transmits a modified answer tone to the calling modem. The calling modem analyzes the signal received in response to the modified answer tone to determine whether characteristics of the current channel are similar to stored characteristics associated with a previous connection over the same channel. If a channel "match" is found, then the modem devices carry out a fast initialization routine that eliminates, abbreviates, or modifies a number of procedures or protocols that are carried out in conventional modem startup processes.

34 Claims, 6 Drawing Sheets

U.S. PATENT DOCUMENTS

| | | |
|---|---|---|
| 5,513,251 A | 4/1996 | Rochkind et al. |
| 5,519,767 A | 5/1996 | O'Horo et al. |
| 5,550,908 A | 8/1996 | Cai et al. |
| 5,600,712 A * | 2/1997 | Hanson et al. ......... 379/142.06 |
| 5,606,599 A | 2/1997 | O'Mahony et al. |
| 5,651,060 A | 7/1997 | Holland et al. |
| 5,668,861 A | 9/1997 | Watts |
| 5,684,825 A | 11/1997 | Ko |
| 5,729,594 A | 3/1998 | Klingman |
| 5,757,890 A | 5/1998 | Venkatakrishnan |
| 5,764,278 A | 6/1998 | Nagao |
| 5,764,736 A | 6/1998 | Shachar et al. |
| 5,796,808 A | 8/1998 | Scott et al. |
| 5,802,153 A | 9/1998 | Sridhar et al. |
| 5,862,474 A | 1/1999 | Kimball |
| 5,896,444 A | 4/1999 | Perlman et al. |
| 5,903,602 A | 5/1999 | Torkkel |
| 5,905,781 A * | 5/1999 | McHale et al. ......... 379/93.14 |
| 5,940,489 A | 8/1999 | Cohn et al. |
| 6,104,800 A | 8/2000 | Benson |
| 6,314,170 B1 | 11/2001 | Noguchi et al. |
| 6,345,071 B1 | 2/2002 | Hamdi |
| 6,430,219 B1 * | 8/2002 | Zuranski et al. ............ 375/231 |
| 6,449,349 B1 * | 9/2002 | Higuchi ................. 379/100.17 |
| 6,560,321 B1 * | 5/2003 | Chen et al. ............ 379/100.17 |
| 6,574,239 B1 | 6/2003 | Dowling et al. |

FOREIGN PATENT DOCUMENTS

| | | |
|---|---|---|
| EP | 0 409 641 A3 | 1/1991 |
| EP | 0 601 260 B1 | 6/1994 |
| EP | 0 711 060 A1 | 5/1996 |
| EP | 0 409 641 B1 | 6/1996 |
| EP | 0 741 481 A2 | 11/1996 |
| EP | 0 812 096 A2 | 12/1997 |
| EP | 0 812 096 A3 | 12/1999 |
| FR | 2 771 577 | 5/1999 |
| WO | WO 96/05684 A | 2/1996 |
| WO | WO 97/49228 | 12/1997 |
| WO | WO 99/27702 | 6/1999 |
| WO | WO 99/27702 A | 6/1999 |
| WO | WO 99/31813 | 6/1999 |
| WO | WO 99/48304 A | 9/1999 |

OTHER PUBLICATIONS

Multitech "V.92 Q&A", Internet, Online, Sep. 5, 2000, Retrieved from the Internet: <URL: HTTP://WWW.MULTICH.COM/APPLICATIONS/DATA_FAX/V92.ASP>.

* cited by examiner

METHOD AND APPARATUS FOR FAST V.90 MODEM STARTUP

RELATED APPLICATION

This application is a Continuation of U.S. application Ser. No. 09/361,842, filed Jul. 27, 1999 now U.S. Pat. No. 6,819,749, which claims the benefit of U.S. provisional application Ser. No. 60/128,874, filed Apr. 12, 1999.

FIELD OF THE INVENTION

The present invention relates generally to modem systems. More particularly, the present invention relates to the initialization of a V.90 modem system.

BACKGROUND OF THE INVENTION 56 kbps modems are now standardized in accordance with the ITU V.90 Recommendation. However, many 56 kbps modems, particularly end user modems, may only be compatible with legacy modes such as K56flex, V.34, V.FC, and V.32. Such legacy modems, and downwardly compatible V.90 modems, may have an undesirably long connect or initialization time between dial-up and full rate data mode. The startup time can be up to 30 seconds, which can be rather annoying and unattractive from the perspective of the end user, especially in light of other data communication protocols that appear to operate in an "always connected" manner.

V.90 modems that support legacy modem protocols typically perform the functions shown in Table 1 during initialization. The time periods associated with the operations set forth in Table 1 may vary from connection to connection depending upon various factors such as the server speed and channel conditions.

TABLE 1

Conventional V.90 Modem Startup

| PROTOCOL | OPERATION | TIME (seconds) |
| --- | --- | --- |
| — | Dialing | 1 |
| — | Call Establishment | 1 |
| V.8 bis | Capabilities Exchange | 3.5 |
| V.8 | Capabilities Exchange | 3.5 |
| V.90 Phase 2 | Probing & Ranging | 1.5 |
| V.90 Phase 3 | Digital Impairment Learning; Initial APCM Training | 8.5 |
| V.90 Phase 4 | Final APCM Training; Set Power Levels; Constellation Transmission | 2.5 |
| V.42/V.42 bis | Error Correction; Data Compression | 0.5 |
| — | Login | 0.5–5 |
| | | TOTAL = 22.5–27.0 |

The V.8bis operation includes a relatively long timeout period that encompasses much of the time period associated with the operation. This operation is described in detail in ITU-T Recommendation V.8bis (International Telecommunication Union, August 1996), the content of which is incorporated by reference herein. The V.8bis protocol is an extension of the V.8 protocol, as described in ITU-T Recommendation V.8 (International Telecommunication Union, February 1998), the content of which is incorporated by reference herein. In accordance with V.8bis and/or V.8, the two modem devices exchange their individual capabilities such that compatible protocols may be utilized during subsequent initialization and data communication procedures.

The various V.90 startup phases are utilized to determine the analog and digital channel characteristics, to train the modem equalizers, and to otherwise attempt to optimize the current communication session. The details of the V.90 startup phases and other aspects of a V.90 modem system may be found in ITU-T Recommendation V.90 (International Telecommunication Union, September 1998), the content of which is incorporated by reference herein. Although a portion of the V.90 startup segments shown in Table 1 are required without regard to the location or status of the client modem, many of the operations could be eliminated or shortened upon repeated connections associated with the same (or nearly identical) channel characteristics.

In a conventional V.90 modem system, error correction and data compression techniques are performed during the V.42/V.42bis stage. The specifics of V.42 are contained in ITU-T Recommendation V.42 (International Telecommunication Union, October 1996), the content of which is incorporated by reference herein. The specifics of V.42bis are contained in ITU-T Recommendation V.42bis (International Telecommunication Union, January 1990), the content of which is incorporated by reference herein. The V.42 operation is desirable such that the modem system can perform the login procedure in a substantially "error free" mode. The login procedure may be conducted with CHAP and PAP protocols; both are utilized for security purposes in the context of point-to-point protocol ("PPP") connections, e.g., a connection between a client computer and an internet service provider server. From the perspective of the V.90 modem devices, the login information is transmitted as data. Once the login procedure is performed, the dial-up connection is complete and data may be transmitted between the server and the host software associated with the client.

The widespread use of the internet as a daily research, entertainment, and communication tool has increased the deployment of 56 kbps modems. However, many channels can only support legacy modes such as V.34. Thus, although most newer modems. (particularly those sold with new personal computers) are compatible with the V.90 Recommendation, many legacy modes are still in use. The long initialization period associated with V.90 modems that fall back into legacy modes may be annoying and undesirable in many applications and can be a serious hindrance where a user would like to establish an immediate connection after an unanticipated disconnect. In addition, even in the context of a connection between two V.90 modem devices, the long V.90 startup phases may test the mettle of an impatient end user. Accordingly, it would be highly desirable to reduce the initialization time normally associated with a conventional V.90 modem system.

SUMMARY OF THE INVENTION

The present invention provides techniques to shorten the startup time associated with a data communication system that employs a modem. The fast startup technique leverages the known channel characteristics of a previous connection to reduce the initialization period associated with subsequent attempts to establish the same connection. In accordance with one illustrative embodiment, the techniques of the present invention are utilized to reduce the connection time for a communication session that follows an upper layer protocol, e.g., PPP. Although not limited to any specific modem application, the fast startup procedure may be used to eliminate portions of the initialization protocols or processes normally employed by a V.90 modem, e.g., V.8bis, V.8, digital impairment learning, initial training, probing and ranging, or the like. In addition, the fast startup technique may perform certain operations at a different time or in a different order in comparison to a conventional modem startup technique.

The above and other aspects of the present invention may be carried out in one form by a method for reducing startup latency associated with a data transmission system having a first device configured to communicate with a second device over a communication channel. The illustrative method involves the establishment of a call between the first device and the second device, followed by a determination of whether a characteristic of the present communication channel is similar to a corresponding characteristic associated with a previously established communication channel. If the characteristic of the present channel is similar to the characteristic of the previous channel, then the first device and/or the second device is initialized in response to a number of stored parameters associated with the previous channel.

BRIEF DESCRIPTION OF THE DRAWINGS

A more complete understanding of the present invention may be derived by referring to the detailed description and claims when considered in connection with the Figures, where like reference numbers refer to similar elements throughout the Figures, and:

FIG. 5 is a timing diagram corresponding to a fast startup process performed by two modem devices.

DETAILED DESCRIPTION OF A PREFERRED EMBODIMENT

The present invention may be described herein in terms of functional block components and various processing steps. It should be appreciated that such functional blocks may be realized by any number of hardware components configured to perform the specified functions. For example, the present invention may employ various integrated circuit components, e.g., memory elements, digital signal processing elements, logic elements, look-up tables, and the like, which may carry out a variety of functions under the control of one or more microprocessors or other control devices. In addition, those skilled in the art will appreciate that the present invention may be practiced in any number of data communication contexts and that the modem system described herein is merely one illustrative application for the invention. Further, it should be noted that the present invention may employ any number of conventional techniques for data transmission, signaling, signal processing and conditioning, and the like. Such general techniques that may be known to those skilled in the art are not described in detail herein.

It should be appreciated that the particular implementations shown and described herein are merely exemplary and are not intended to limit the scope of the present invention in any way. Indeed, for the sake of brevity, conventional encoding and decoding, timing recovery, automatic gain control ("AGC"), synchronization, training, and other functional aspects of the data communication system (and components of the individual operating components of the system) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical communication system.

Figure 1:
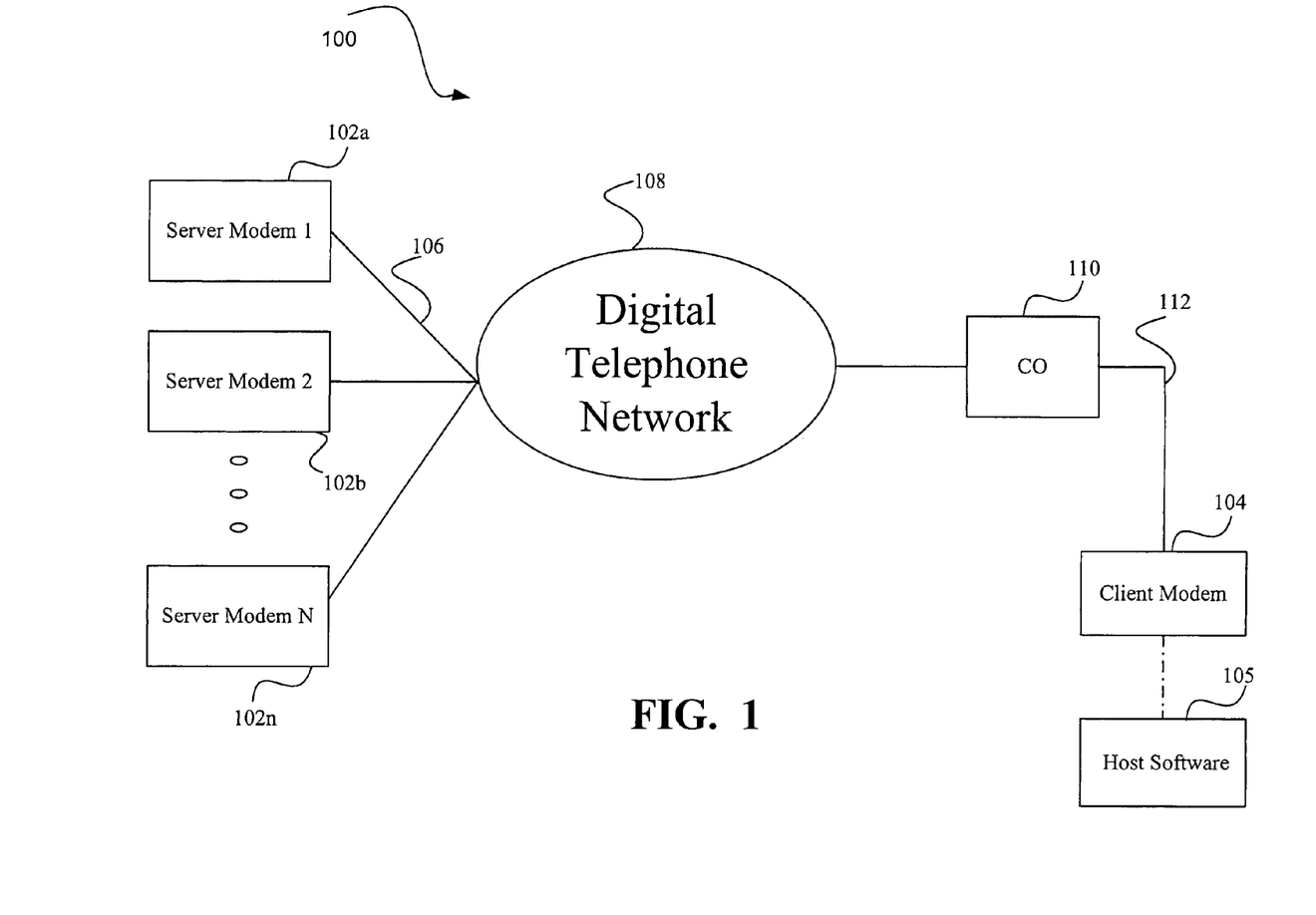
FIG. 1 is a block diagram depicting a general modem system environment capable of supporting point-to-point protocol ("PPP") connections.

FIG. 1 is a block diagram depicting a general modem system 100 in which the techniques of the present invention may be practiced. For purposes of this description, modem system 100 is assumed to be capable of supporting connections associated with an upper layer protocol, e.g., point-to-point protocol ("PPP") connections. PPP connections are typically associated with internet communications between, e.g., an individual end user and an internet service provider. In this respect, modem system 100 includes a plurality of server modems (identified by reference numbers 102a, 102b, and 102n) and a client modem 104. Server modems 102 may each be associated with an internet service provider or any suitable data source. Client modem 104 may be associated with a suitable data source, e.g., a personal computer capable of running host software 105. For purposes of this description, host software 105 may be an operating system such as MICROSOFT WINDOWS, or any application program capable of functioning in conjunction with modem system 100. Although not shown in FIG. 1, client modem 104 may be integrated with the personal computer.

In the context of this description, modem system 100 may employ 56 kbps modems that are compatible with the V.90 Recommendation, legacy 56 kbps protocols, the V.34 Recommendation, or the like. Although the present invention is described herein in the context of a V.90 modem system, the techniques can be equivalently applied in a V.34 modem system or in any number of legacy modem systems. V.90 or 56 kbps modem devices are suitable for use in modem system 100 where a given server modem 102 utilizes a digital connection 106 to the digital telephone network 108. The client modem 104 is connected to a local central office 110 via an analog local loop 112. Thus, the communication channel established between client modem 104 and any server modem 102 is digital up to the central office 110. Thereafter, the digital signals are converted to an analog signal for transmission over the local loop 112.

If an end user desires to establish an internet connection, host software 105 may perform any number of operations in response to a user command. For example, host software 105 may prompt client modem 104 to dial the telephone number associated with server modem 102a (which, for this example, is the server modem associated with the user's internet service provider). Server modem 102a and client modem 104 perform a handshaking routine that initializes the equalizers, echo cancelers, transmit power levels, data rate, and possibly other operational parameters associated with the current communication channel. In addition, host software 105 may cause client modem 104 to transmit and receive authentication data that enables the user to log onto the internet via the service provider. As mentioned above, the authentication data may be exchanged between server modem 102a and client modem 104 in accordance with the known CHAP or PAP techniques. In an alternate embodiment that employs a non-PPP upper layer protocol, a suitable login procedure may be conducted instead of the CHAP or PAP procedures.

As discussed previously, the dial-up connection time associated with conventional modem systems may be undesirably long. The present invention takes advantage of the repeated use of a communication channel between modem devices, e.g., the communication channel that is established between server modem 102a and client modem 104. Assuming that client modem 104 is associated with a desktop personal computer resident at a specific location, the connection to any given server modem 102 will necessarily be established over the same analog communication channel. In other words, client modem 104 will always establish an analog channel between the user premises and central office 110. Disregarding slight variations in the analog channel due to temperature and other environmental effects, the initialization of client modem 104 (with respect to the analog channel) will remain substantially constant from connection to connection.

Figure 2:
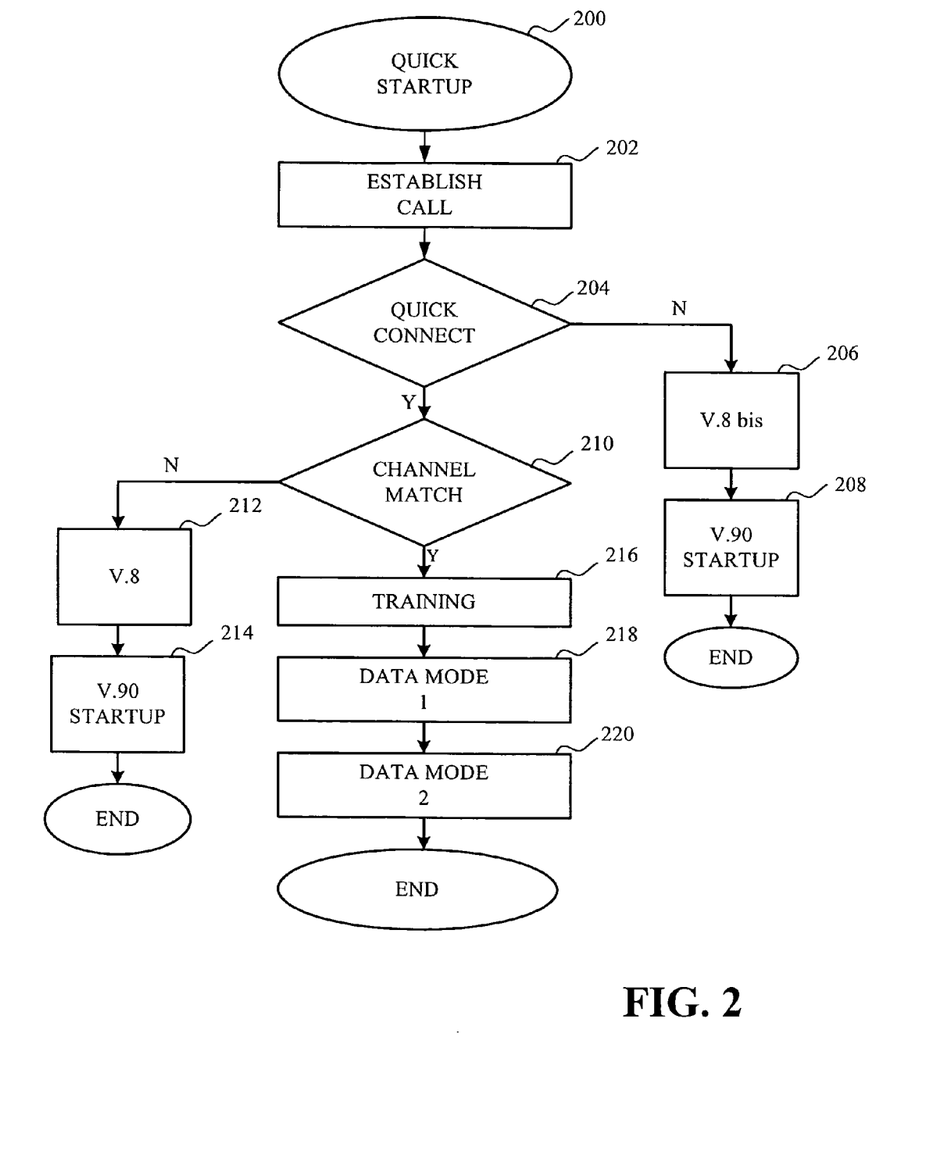
FIG. 2 is a flow diagram of a general fast startup process according to the present invention.

FIG. 2 is a flow diagram of a general fast startup process 200 that may be performed by a data communication system such as modem system 100. In a practical system, process 200 may be cooperatively performed by server modem 102, client modem 104, host software 105, and/or any functional component of modem system 100. In addition, process 200 may be realized in the context of an overall initialization procedure that follows any number of conventional modem protocols.

Fast startup process 200 may begin with a task 202, which relates to the establishment of a call between client modem 104 and a server modem 102. In the context of this example, client modem 104 is considered to be the calling device. Accordingly, host software 105 and/or client modem 104 dials the telephone number associated with, e.g., server modem 102b. Assuming that server modem 102b is capable of making an additional connection, it will go off hook and generate a suitable answer tone in a conventional manner. When both modem devices are off hook and communicating with each other, a communication channel is established via digital connection 106, telephone network 108, central office 110, and analog local loop 112. The dialing, ringing, and answering procedures utilized during task 202 may follow conventional protocols.

Following task 202, a query task 204 may be performed by modem system 100 to ascertain whether a fast connect protocol is supported. Query task 204 may be necessary to enable different server modems and different client modems to be interoperable and compatible. For example, server modem 102b may be a V.90 modem device that supports the fast connect features of the present invention, while client modem 104 may be a legacy 56 kbps modem device that does not support the fast connect features. Portions of query task 204 may be performed by server modem 102b or client modem 104. An illustrative technique for performing query task 204 is described in detail below. Task 204 may be equivalently performed when client modem 104 initiates the call or when server modem 102 initiates the call.

If query task 204 determines that the fast connect protocol is not supported by both modem devices, then a task 206 may follow. Task 206 prompts modem system 100 to begin a conventional initialization routine. For example, in the context of a V.34 or V.90 modem system, task 206 may begin a capabilities exchange protocol such as V.8bis. Alternatively, some modem systems may only implement the V.8 capabilities exchange protocol. Older legacy modem systems may skip the V.8 and V.8bis procedures altogether and perform an appropriate initialization routine according to the legacy mode. Following task 206, modem system 100 may conduct a known startup procedure in accordance with an applicable modem specification. For example, if modem system 100 supports V.90, then task 208 may be associated with conventional V.90 equalizer training, echo canceler training, constellation design, power level verification, and other startup operations. If tasks 206 and 208 are performed, then the startup time associated with the communication session is essentially the same as the startup time for a conventional V.90 connection.

If query task 204 determines that the fast connect protocol is fully supported, then a query task 210 may also be performed. Query task 210 tests whether the characteristics of the established communication channel are similar to corresponding characteristics of a previously established communication channel. Briefly, query task 210 compares one or more attributes of a received sequence to stored attributes of a previously received sequence associated with the previously established channel. The received signal conveys information regarding the characteristics of the communication channel. In particular, the received signal conveys information relative to analog local loop 112.

In the illustrative embodiment described herein, where one modem device is connected digitally to the digital telephone network 108, analog local loop 112 affects signals in a substantially consistent manner from connection to connection. Although the analog characteristics will be similar for repeated connections to the same server modem 102, slight variations in temperature, humidity, other environmental changes, physical changes in the system hardware, and other operational parameters contribute to random fluctuations in the current channel characteristics used for comparison purposes. Nonetheless, the comparison procedure performed during query task 210 is preferably designed to accommodate such fluctuations. For purposes of this description, "similar" characteristics means that query task 210 will assume that the current channel matches a previous channel notwithstanding normal variations due to the uncontrollable and unpredictable factors mentioned above.

If query task 210 determines that the parameters of the current communication channel do not match the parameters of a previous communication channel, then a task 212 may be performed. Task 212, like task 206, prompts modem system 100 to begin a conventional initialization routine. In a preferred embodiment, if modem system 100 verifies that the fast connect protocol is fully supported (query task 204), then most, if not all, of the V.8bis procedure may be skipped. Accordingly, the V.8 capabilities exchange protocol may be prompted by task 212. Thereafter, a task 214 may be performed to cause modem system 100 to enter the conventional V.90 startup procedure. Task 214 is similar to task 208 described above. If tasks 212 and 214 are performed, then the startup time associated with the communication session may be reduced by approximately three seconds, which is the typical time period required to conduct the V.8bis procedures. Accordingly, even if query task 210 determines that the current channel is not similar to a previous channel, fast startup process 200 reduces the overall initialization time of modem system 100.

If query task 210 finds that the current channel characteristics "match" the stored characteristics of a previously established channel, then a task 216 may be performed. An abbreviated training procedure is conducted during task 216. As described in more detail below, modem system 100 leverages the known characteristics of the current channel such that the modem devices can be immediately trained. For example, although the specific timing phase of digital impairments (e.g., robbed bit signaling) may be unknown, the types of digital impairments will be consistent for repeated connections. Thus, in the context of a V.90 modem system, the lengthy digital impairment learning procedure need not be fully implemented. In addition, the initial training of equalizers and echo cancelers, and the initial determination of PCM codec transmit levels and data rates need not be performed.

A task 218 may be performed to enable modem system 100 to operate at an initial data rate. It should be appreciated that portions of the training associated with task 216 may be performed at the initial data rate associated with task 218. Modem system 100 is able to quickly operate at the initial data rate by recalling the initialization parameters associated with the previously stored channel. During task 218, modem system 100 may perform final training of the equalizers and echo cancelers, exchange modulation parameters, and exchange constellation signal points for use during the full rate data mode. In accordance with the present invention, PPP data may be transmitted during task 218 in connection with one or more final training sequences. For example, the PPP data may be associated with the exchange of log-in authentication information, e.g., CHAP or PAP information. In view of the transmission of data during task 218, this portion of fast startup process 200 may be considered to be a first data mode or a data phase one.

Following task 218, fast startup process 200 causes modem system 100 to operate at a final data rate (task 220). In the context of this embodiment, this portion of process 200 may be considered to be a second data mode or a data phase two. The transition between the initial and final data rates preferably occurs in a seamless manner; modem system 100 employs a suitable signal timing or synchronization technique to enable such a data rate transition. During the full data mode, modem system 100 utilizes the signal point constellation exchanged during task 218. Once modem system enters the final data mode, fast startup process 200 ends.

Figure 3:
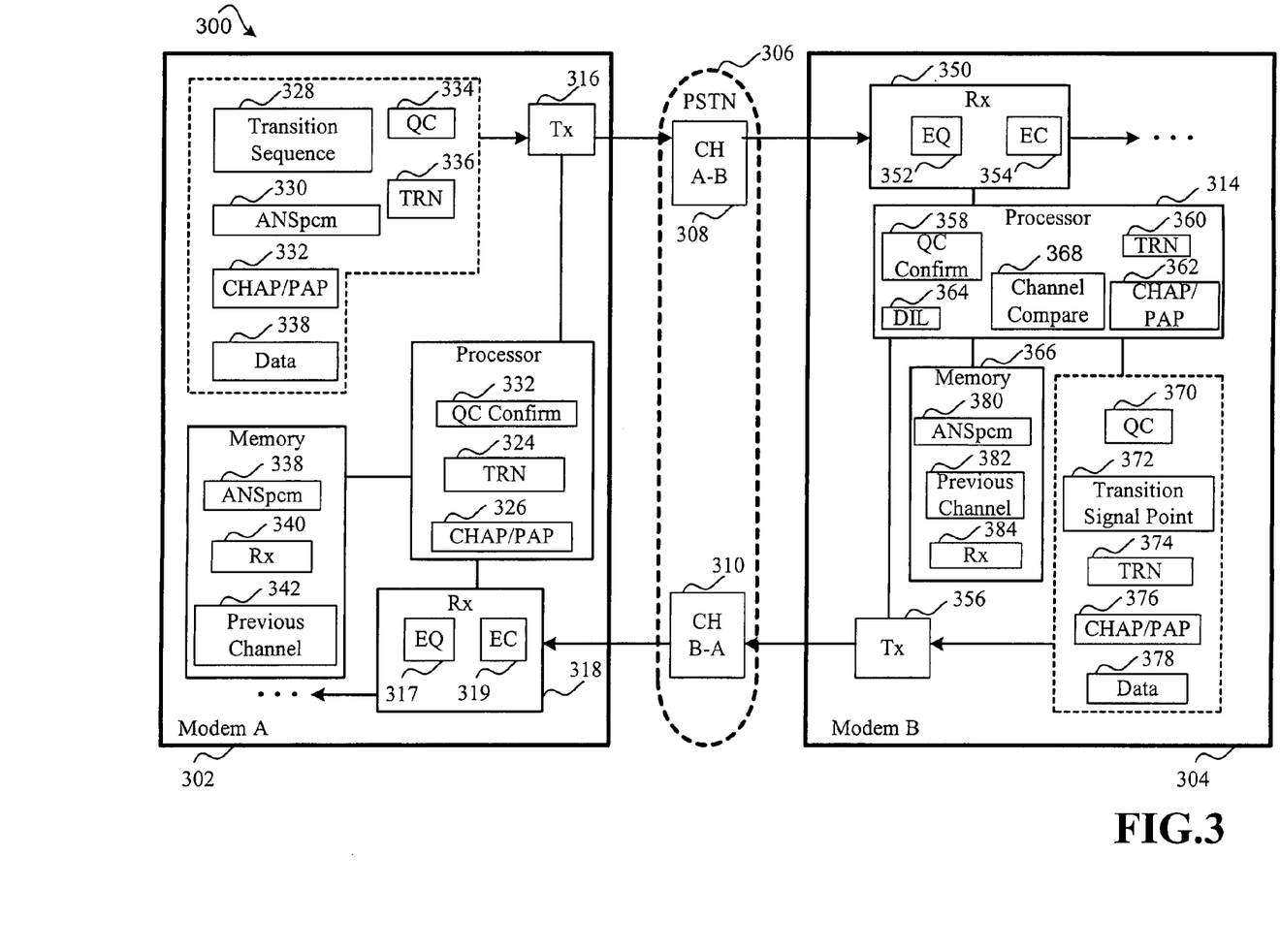
FIG. 3 is a block diagram depicting an illustrative modem system configured in accordance with the present invention.

FIG. 3 is a block diagram depicting an illustrative modem system 300 configured in accordance with the present invention. Modem system 300 is preferably configured to carry out fast startup process 200 and other processes described herein. By way of example, modem system 300 is described herein in the context of a 56 kbps or V.90 system (or a system substantially similar to a V.90 system). However, it should be appreciated that the particular implementation shown in FIG. 3 is not intended to limit the scope of the present invention in any way.

Generally, modem system 300 includes a first modem, e.g., modem 302, and a second modem, e.g., modem 304. In the context of this description, modem 302 is considered to be a server modem and modem 304 is considered to be a client modem (see FIG. 1). It should be appreciated that modems 302 and 304 may be similarly configured such that both can function in either a transmit or receive mode. Modems 302 and 304 are generally configured in accordance with known principles to communicate over a telecommunication network, such as the public switched telephone network ("PSTN") 306, via at least one communication channel (e.g., channels 308 and 310). For purposes of this description, modem 302 is connected digitally to PSTN 306 while modem 304 is connected to PSTN via a central office (not shown) and an analog local loop, as described above in connection with FIG. 1. For the sake of clarity, FIG. 3 does not show the various encoder, decoder, and other functional elements that would typically be present in a practical modem system.

Modem 302 may include a processor element 312, while modem 304 may include a processor element 314. In addition to the specific operations described herein, processors 312 and 314 are suitably configured to carry out various tasks associated with the operation of modem system 300. Indeed, modem system 300 may incorporate any number of processors, control elements, and memory elements as necessary to support its functionality. Such processor, control, and memory elements may suitably interact with other functional components of modems 302 and 304 to thereby access and manipulate data or monitor and regulate the operation of modem system 300.

Processor 312 may be operatively associated with a fast connect confirmation routine, which is illustrated as a functional block 322. Fast connect confirmation routine 322 may be employed during query task 204 (see FIG. 2). Processor 312 is also operatively associated with a number of training routines 324. Training routines 324 may be utilized for initial and/or final training of modem system 300. Training routines 324 may be employed during task 216, as described above. Processor 312 may also operate in conjunction with a dial-up authentication scheme 326, e.g., information exchanging in accordance with PAP or CHAP. The CHAP/PAP functionality may be alternatively (or additionally) realized in one or more software applications maintained by the server corresponding to modem 302. These illustrative operations are not intended to limit the applicability of processing element 312, which is preferably configured to support any number of additional operations.

Modem 302 includes a transmitter 316, which is configured to transmit encoded symbols in accordance with conventional data transmission techniques. Such symbols may represent data, training sequences, synchronization signals, control signals, information exchange sequences, and any suitable communication signal utilized by modem system 300. Modem 302 also includes a receiver 318, which may be configured in accordance with any number of known modem technologies. Receiver 318 is configured to receive communication signals from modem 304; such signals may include encoded information bits, control signals, information exchange sequences, training sequences, and the like. Receiver 318 may include or be functionally associated with an equalizer structure 317 and an echo canceler structure 319. The configuration and operation of equalizer structure 317 and echo canceler structure 319 may be consistent with any number of conventional techniques, e.g., adaptive filtering algorithms.

Modem 302 is preferably configured to generate, process, and transmit different data and signals associated with the operation of modem system 300. Such data, signals, and sequences may be suitably stored, formatted, and produced by any number of microprocessor-controlled components. For illustrative purposes, FIG. 3 depicts a number of blocks related to different operational features of modem system 300; such operational features may have specific data sequences, control signals, or the like, associated therewith. Although a practical system may process and transmit any amount of additional or alternative data, the particular embodiment described herein functions in cooperation with at least the following types of data: a transition sequence 328, an answer signal point sequence 330, authentication information 332, a fast connect identifier 334, training information 336, and user data 338. This data, and the handling of the data by modem system 300, is described in detail below.

Modem 302 also includes a suitable amount of memory 320 necessary to support its operation. Memory element 320 may be a random access memory, a read only memory, or a combination thereof. Memory element 320 may be configured to store information utilized by modem system 300 in connection with one or more processes related to the present invention. For example, memory element 320 may be configured to store a suitable answer signal point sequence 338. Memory 320 may store specific signal points, transmit levels, a pattern utilized to format a sequence for transmission, or the like. In the preferred embodiment, answer signal point sequence 338 corresponds to sequence 330 (described above). Memory element 320 may also be configured to store a number of parameters related to the training of receiver 318. These receiver parameters, which are depicted as block 340, may be associated with the initialization of equalizer structure 317 and/or echo canceler structure 319. As a practical matter, memory element 320 may store information related to the analog and/or digital characteristics, e.g., filter tap coefficients, of equalizer structure 317 and echo canceler structure 319, and transmit codec level estimates.

Modem 304 includes a receiver 350, which is operatively associated with an equalizer structure 352 and an echo canceler structure 354. Receiver 350 is configured to receive communication signals from modem 302. Modem 304 also includes a transmitter 356 configured to transmit communication signals to modem 302. These components of modem 304 may be similar to the corresponding components of modem 302. Thus, for the sake of brevity, the description of features and functions that are common to modems 302 and 304 will not be repeated in this description of modem 304.

Processor 314 may be operatively associated with a fast connect confirmation routine 358, one or more training routines 360, and a dial-up authentication scheme 362. These processing functions are similar to the corresponding functions described above in connection with processor 312. In addition to these features, processor 314 may be operatively associated with a digital impairment learning routine 364. Digital impairment learning routine 364 may be compatible with the digital impairment learning procedure carried out by conventional V.90 modems. Routine 364 may be utilized to enable modem 304 to analyze a digital impairment learning sequence transmitted by modem 302 and to determine the types of digital impairments present in the communication channel and any timing phases associated with such digital impairments. Routine 364 may interact with a memory element 366 such that modem 304 can store the digital impairment profile associated with a given communication channel. Routine 364 may enable modem 304 to select appropriate signal points (or a signal point) that function to illuminate or highlight robbed bit signaling present in the channel. For example, if modem 304 determines that the network forces robbed bits (typically the least significant bit of a symbol) to zeros, then a signal point having a least significant bit of one may be selected such that the robbed bit signaling phases can be easily detected.

Processor 314 may also be configured to conduct a channel comparison routine 368, which may be performed during task 210 described above in connection with FIG. 2. Channel comparison routine 368 preferably determines whether the characteristics of the current communication channel are similar to stored characteristics associated with a previously established communication channel. In the context of this description, the current channel is a repeated connection of the previously established channel, and a number of stored characteristics may be resident in memory element 366. Routine 368 is described in more detail below.

As with processor 312, the illustrative operations set forth herein are not intended to limit the applicability of processing element 314, which is preferably configured to support any number of additional operations.

Like modem 302, modem 304 is configured to generate, process, and transmit different data and signals associated with the operation of modem system 300. Such data, signals, and sequences may be suitably stored, formatted, and produced by any number of microprocessor-controlled components. Although a practical system may process and transmit any amount of additional or alternative data, transmitter section 356 is illustrated in conjunction with the following types of data: a fast connect identifier 370, a transition sequence signal point identifier 372, training information 374, authentication information 376, and user data 378. This data, and the handling of the data by modem system 300, is described in detail below.

As mentioned above, modem 304 includes a suitable amount of memory 366 necessary to support its operation. Memory element 366 is similar to memory element 320. In the preferred embodiment, memory element 366 is configured to store an answer signal point sequence 380 that is related to the corresponding answer signal point sequence 338 utilized by modem 302. In this embodiment, the same answer signal point sequence is predetermined and known at both modems 302 and 304. Memory element 366 may also store a number of parameters, attributes, and/or characteristics of a previously established channel (illustrated as a previous channel block 382). The previous channel parameters 382 may be stored at any suitable time during a communication session or periodically updated during a session. Like memory element 320, memory element 366 may also be configured to store a number of parameters 384 related to the training of receiver 350. These stored receiver parameters 384 are preferably accessed by modem 304 to effectively reduce the startup latency typically experienced with conventional V.90 modem systems.

A number of features of the present invention contribute to the reduction in conventional V.90 modem startup times, e.g., the elimination or abbreviation of the V.8bis procedure, the elimination or abbreviation of the initial training procedure, and the exchanging of login authentication data earlier in the initialization process (rather than waiting until the full data rate is achieved). In one embodiment, the login authentication data is exchanged while the modem system is in an initially trained mode associated with an intermediate data rate. Any one of these (and other) features of the present invention may be implemented in modem system 300.

Figure 4:
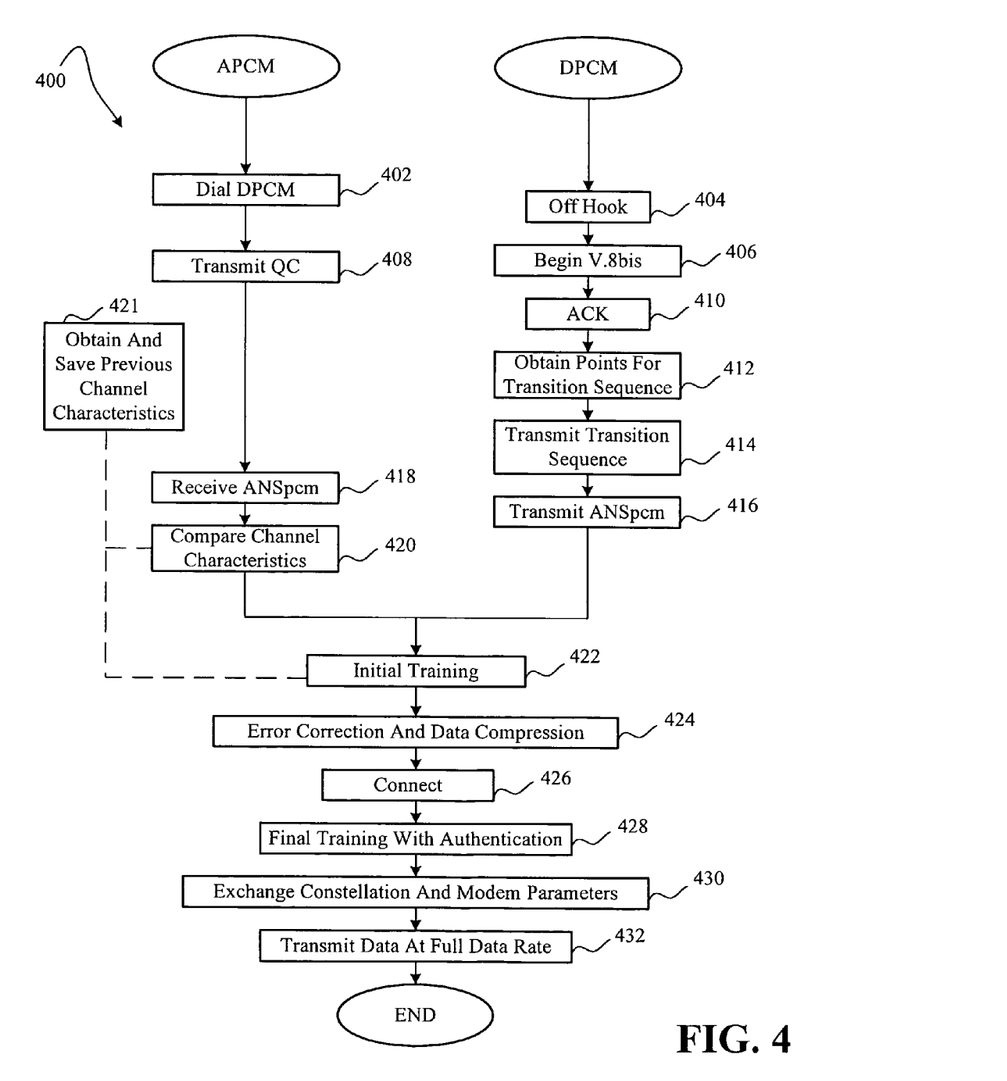
FIG. 4 is a flow diagram illustrating portions of a fast startup process performed by two modem devices.

FIG. 4 is a flow diagram illustrating portions of a fast startup process 400 performed by two modem devices, and FIG. 5 is a timing diagram 500 corresponding to an illustrative fast startup process performed by two modem devices. Timing diagram 500 includes acronyms and abbreviations that are often used in the context of V.8, V.8bis, V.34, V.90, and other data communication protocols. The use of such terminology herein is intended to illustrate the concepts of the present invention in the context of one practical embodiment. However, the present invention may be employed in any suitable context, and the specific signals, number of sequences, timing of the sequences, data rates, and interaction between the two modem devices shown in FIG. 5 are not intended to limit the scope of the invention in any way.

Fast startup process 400 is depicted in a manner that indicates tasks associated with a client modem, e.g., an analog pulse code modulation modem ("APCM"), and a server modem, e.g., a digital pulse code modulation modem ("DPCM"). Similarly, timing diagram 500 shows the general sequencing of signals transmitted by an APCM and a DPCM. In FIG. 5, the arrows between the two major sequences represent responses or interactions between the APCM and the DPCM.

Fast startup process 400 may begin with a task 402, which causes the APCM to dial the telephone number associated with the DPCM. As described above, the call will be established over local loop 112, central office 110, and digital telephone network 108 (see FIG. 1). In response to the initial ring tone, the DPCM may be placed in an off hook state (task 404), i.e., the DPCM will answer the call. Of course, the APCM and the DPCM may be configured to place, answer, and process calls in accordance with conventional telephony protocols. Following task 404, a task 406 may be performed to initialize a capabilities exchange protocol such as V.8 or V.8bis. In the embodiment described herein, a capabilities request signal (represented by CRe' in FIG. 5) may be transmitted during task 406. The CRe' signal may function to inform the APCM that the DPCM supports the fast connect procedure. The CRe' signal may be a modified version of the conventional V.8bis signaling tones, e.g., the V.8bis tones may be amplitude modulated. Alternatively, the frequency associated with a signaling tone may be jittered in a periodic manner or a low-level wideband signal may be added to a tone. In this manner, legacy modem systems will recognize the CRe' signal as the normal V.8bis CRe signal.

In response to the establishment of a call associated with the current communication channel, the APCM may perform a task 408 to suitably transmit a fast connect identifier (FC) to the DPCM. In the practical embodiment described herein, the transmission of the fast connect identifier may be prompted in response to the detection of the CRe' signal by the APCM. The FC signal is preferably designed such that legacy modems and modems that do not support the fast connect protocol are not adversely affected by the FC signal, i.e., the FC signal should be ignored by non-compatible devices. (If the APCM does not support the fast connect techniques described herein, then it will not generate the FC signal and the startup will proceed in a conventional manner, as described above in connection with FIG. 2). In a preferred embodiment, the FC signal also conveys a signal point identifier that identifies signal points (or one point) for use by the DPCM in a transition sequence (represented by QTS and QTS\ in FIG. 5), where the signal points function to highlight, illuminate, or make apparent the digital impairments present in the communication channel. Thus, the FC signal sequence performs a dual function.

Assuming that the DPCM also supports the fast connect methodology, it preferably performs a task 410 in response to the reception of the FC signal. In connection with task 410, the DPCM transmits a fast connect acknowledgment (represented by the FCA signal in FIG. 5). As described above in connection with FIG. 2, if the DPCM does not acknowledge the FC signal, or if the APCM somehow fails to receive the FCA signal, then the modem system will proceed with a conventional startup procedure. The format, configuration, and processing of the FC and FCA signals may be carried out by the respective portions of the individual modems, as described above in connection with modem system 300 (see FIG. 3).

If the DPCM and the APCM both support the fast connect technique, then any number of initialization routines may be eliminated, modified, or abbreviated, depending upon the specific application. For example, in the context of a V.90 compatible modem system, the transmission of the FC signal may inherently indicate that the APCM is V.90 compliant. Similarly, the transmission of the FCA signal may inherently indicate that the DPCM is also V.90 compliant. Consequently, the modem system may eliminate portions or the entirety of the normal capabilities exchange protocol or protocols, such as V.8 and/or V.8bis. This feature by itself can reduce the startup latency by as much as five seconds (for a typical connection).

It should be appreciated that the fast connect identification and verification scheme described above in connection with task 402 through task 410 can be equivalently applied when the DPCM initiates the call to the APCM. Such a situation may arise when, in response to an initial call or request from the APCM, the DPCM calls the APCM to establish the communication channel. In this situation, the APCM will transmit the CRe' signal, the DPCM will transmit the FC signal, and the APCM will transmit the FCA signal. In contrast to the above description where the APCM initiates the call, the APCM may transmit an additional signal or sequence to suitably identify the transition sequence signal points to the DPCM (rather than embedding the signal points in the CRe' or FCA sequences).

Following task 410, the DPCM may perform a task 412 to obtain the signal points (or point) for use in a transition (or synchronization) sequence. As discussed above, the FC signal preferably conveys information that identifies signal points that make the presence of robbed bit signaling easily detectable by the APCM. The determination of the particular signal points may be carried out by the APCM, as described above in connection with the digital impairment learning procedure 364 (see FIG. 3). This determination may be based on past analyses of the digital impairments associated with a previous connection over the same channel. Task 412 may be performed by processor 312 after the APCM receives the FC signal.

In response to task 412, a task 414 may be performed such that a suitable transition sequence is transmitted by the DPCM. In an exemplary embodiment, the transition sequence includes positive and negative values of the signal points obtained in task 412. Accordingly, the DPCM may utilize the signal points selected by the APCM and a suitable sign pattern (which may be predetermined) to generate the transition sequence. The transition sequence is configured and formatted such that the APCM, upon detecting the transmission sequence, can synchronize itself to the subsequent signal or sequence transmitted by the DPCM. In this manner, the APCM receiver can obtain its timing from the transition sequence. The transmission sequence may be of any predetermined length and have any predetermined sign pattern. For example, in the embodiment depicted in FIG. 5, the transition sequence is represented by the quick timing sequence (QTS) and QTS\ signals, where QTS represents a specific signal point sequence and QTS\ is the same sequence having opposite signs. In FIG. 5, the QTS sequence is repeated for 810 symbols while the QTS\ sequence is repeated for 30 symbols.

In accordance with one practical embodiment of the present invention, the QTS sequence is formatted such that the period of the QTS root sequence and the period of the robbed bit signaling ("RBS") associated with the network connection have no common denominator (other than one). For example, one suitable QTS root sequence is 0, +A, −A, +A, −A (where A represents a signal point that highlights the presence of RBS. Thus, for the embodiment illustrated in FIG. 5, this QTS root sequence, which has a period of five, is repeated 162 times while the QTS\ sequence includes six repetitions of the root QTS sequence with inverted signs.

For the above example, where the RBS period is assumed to be six, the received transition sequence may be subjected to a 30-point discrete Fourier transform ("DFT") to obtain the timing phase of the DPCM. In addition, the presence of RBS will be revealed at certain discrete frequencies associated with the DFT result. In this manner, timing and RBS information can be extracted from the received transition sequence. In addition, the timing phase information is obtained independently from the RBS information.

The DPCM is preferably configured to transmit a specific signal point sequence during a task 416. The signal point sequence may be considered to be a modified answer tone, as that term is understood by those familiar with modem protocols. In FIG. 5, this signal point sequence is represented by the ANSpcm signal. As depicted in FIG. 3, a predetermined ANSpcm sequence 338 may be stored in memory element 320 for transmission by transmitter section 316. In a practical embodiment, the DPCM transmits the ANSpcm signal following the transition sequence. This may be desirable to enable the APCM to anticipate the signal point sequence once it detects the transition sequence. In other words, the detection of the transition sequence by the APCM will indicate that the signal point sequence will follow.

In a preferred embodiment, the ANSpcm signal comprises a sequence of pulse code modulation signal points or a sequence of signal points associated with pulse code modulation signal points. For example, the ANSpcm signal may be formatted as a sequence of mu-law or A-law codewords or a sequence of universal codewords (U-codes). The APCM and the DPCM are preferably configured such that the ANSpcm signal is predetermined and known prior to the initiation of fast startup process 400. In an alternate embodiment, a number of different ANSpcm signals may be suitably stored in lookup tables or the ANSpcm signal may be designed by one of the modem devices and communicated in a suitable manner to the other modem device prior to task 416. For example, the ANSpcm signal may be designed such that the presence of RBS can be easily detected by the APCM by analyzing the received ANSpcm signal. In such an embodiment, it may not be necessary for the transition sequence (QTS and QTS\) to identify or highlight the RBS.

In the context of V.8, the answer tone is generated as an amplitude modulated 2100 Hz tone. In contrast, the present invention utilizes the ANSpcm signal to generate a tone (e.g., a 2100 Hz tone) in a digital manner using pulse code modulation signal points. In other words, the ANSpcm signal is a digital representation of an analog signal. The ANSpcm signal is preferably constructed with known pulse code modulation points such that the ANSpcm signal may be used for purposes other than a mere answer tone. In a preferred embodiment, the ANSpcm signal includes many of the available pulse code modulation points associated with the particular telephone network. This aspect of the ANSpcm signal is desirable such that the ANSpcm signal may be used to determine or identify the characteristics of the current communication channel, particularly digital pads. The use of a large number of the possible codewords ensures that the ANSpcm signal will detect digital pads that may merge two input levels into one output level. The ANSpcm signal is also configured to provide a tone suitable for disabling the network echo cancelers and disabling the network echo suppressors.

As described above, the APCM anticipates the transmission of the ANSpcm signal. The digital impairments and analog characteristics associated with the communication channel will affect the ANSpcm signal as it is transmitted from the DPCM to the APCM. A task 418 may be performed by the APCM to obtain a received sequence that is related to the ANSpcm signal point sequence. The APCM may then perform a task 420 to compare a number of attributes of the received sequence with a number of stored attributes of a previously received sequence associated with a previously established communication channel. In an illustrative embodiment, the previously received sequence is a digital impairment learning ("DIL") sequence, which is a line probing sequence. In this respect, task 420 determines whether a characteristic of the current channel is similar to a corresponding characteristic of a previously established channel. In a preferred embodiment, the channel characteristics compared in task 420 are related to the digital impairments in the channel. In other words, task 420 validates a current digital impairment channel profile with a stored digital impairment channel profile. Task 420 may be performed by a suitable processor element of the APCM (see FIG. 3.).

During task 420, any measurable characteristic of the points/levels, any measurable characteristic of the received sequence as a whole, and/or any measurable signal or quantity associated with the points/levels may be analyzed by the APCM. For example, any number of individual points or levels contained in the received sequence may be compared to corresponding points or levels stored at APCM (the stored points or levels may be associated with a prior DIL procedure). If the received points/levels "match" the stored points/levels or if the differences between the received and stored points/levels are within a certain threshold, then the APCM may assume that the current channel attributes match the stored channel attributes (see query task 210 in FIG. 2).

The APCM may perform a procedure 421 to suitably obtain and save a number of attributes or characteristics of a previously established connection to the current channel. As described above, procedure 421 may cause the APCM to store the characteristics of the points/levels contained in a received DIL sequence. These past values are thereafter used during task 420. In this respect, procedure 421 may update the previous values with new DIL values after the comparison in task 420 is completed, e.g., in response to a subsequent DIL procedure associated with the current connection.

As described above in connection with FIG. 2, if task 420 determines that the channel characteristics do not sufficiently match, then the modem system may revert to a conventional V.90 startup procedure. FIG. 5 illustrates that the APCM may fall back into the V.8 protocol and transmit a conventional V.8 call menu (CM) message to the DPCM. The conventional V.8 startup for the APCM then follows along a sequence 502. In response to the CM message, the DPCM generates a conventional V.8 joint menu (JM) message and proceeds in accordance with the conventional V.8 initialization (indicated by a sequence 504). For the sake of illustration, fast startup process 400 assumes that task 420 determines that the current communication channel is similar to a previously established communication channel.

If the APCM validates the current channel characteristics with a previous channel, then it may trigger a fast startup routine to further reduce the initialization time associated with the modem system. Alternatively, the DPCM may be configured to trigger the fast startup routine. Accordingly, a task 422 may be performed, during which the modem system is initially trained. (For the sake of clarity and brevity, portions of task 422 and portions of the subsequent tasks may be performed by both the APCM and the DPCM; fast startup process 400 depicts such combined functionality in the context of single process tasks). Task 422 may cause the APCM and the DPCM to be initialized in response to a number of stored parameters associated with the previously established communication channel. As mentioned above, the stored parameters may be related to the initialization or training of the equalizers, echo cancelers, transmit power levels, initial signal point constellations, or the like. Task 422 may operate in conjunction with procedure 421, which preferably functions to obtain and store the initialization parameters associated with the previous connection. In this respect, procedure 421 may be suitably designed to periodically save such parameters during the normal data mode of the previous connection, after a renegotiation process, or in response to any condition or event associated with the previous communication session. Procedure 421 may also be configured such that erroneous settings or initialization parameters are not inadvertently saved.

In the context of a typical V.90 connection, task 422 may be related to a two-point training phase. Using the previous parameters, the modem system may be able to skip or abbreviate the conventional V.90 Phase 2 probing and ranging procedure and to skip or abbreviate the conventional V.90 Phase 3 digital impairment learning and initial training procedures. As shown in FIG. 5, the APCM and the DPCM may each transmit training sequences (represented by the TRN1 signals) during task 422. These training signals may be utilized to adaptively adjust the equalizer and echo canceler filter taps and to otherwise facilitate training of the modem system. Thus, one of the most time consuming procedures of a V.90 startup (the training of the APCM equalizer) can be performed in an efficient manner that allows ample time for fine tuning and training.

In addition to the initial training that occurs during task 422, a task 424 may be performed. During task 424, the modem system may conduct error correction and/or data compression protocols. In a conventional V.90 modem system, the V.42 Recommendation is followed for purposes of error correction and the V.42bis Recommendation is followed for purposes of data compression. For example, in a normal V.90 operating mode associated with a PPP connection, the V.42 and V.42bis procedures are performed after final training and before the CHAP/PAP authentication procedure. V.42 and V.42bis are performed prior to the CHAP/PAP procedure because the CHAP/PAP procedure is better suited to an "error free" channel. In contrast to conventional V.90 systems, task 424 may perform V.42bis during Phase 3 of the V.90 startup. The shifting of V.42bis forward in the startup process contributes to the reduction in connection time. In FIG. 5, the XID' signal represents a modified version of the conventional V.42 XID signal. For example, the XID' signal may utilize a subset of the XID parameters used to negotiate compression and the like. Portions of the V.42bis procedure may also be conducted in connection with various modified signal sequences shown in FIG. 5. For example, the CPt' signal may represent the conventional V.90 CPt signal combined with one or more V.42bis signals.

In the preferred embodiment, the V.42bis procedures are performed to provide a substantially "error free" channel. Following task 424, a CONNECT message is issued to the host software. The CONNECT message indicates that the modem system is ready to transmit data at an initial data rate at this time. The CONNECT message may be formatted, generated, and transmitted in accordance with known techniques.

In response to the CONNECT message, the host software begins a "simultaneous" upper layer protocol login procedure, e.g., a CHAP or PAP procedure (task 428). Task 428 may be initiated automatically by the host software or in response to a user entry. The CHAP/PAP data transmission occurs in conjunction with a final training process. In the preferred embodiment, the APCM and the DPCM transmit the CHAP/PAP authentication data as scrambled digital data over the communication channel. The scrambling of the authentication data enables the modem devices to perform final training on the authentication data. In a conventional V.90 modem system, the final training signals are formatted as scrambled "ones". The scrambled ones carry no information; the final training signal is merely utilized as a spectrally white source. The present invention leverages the final training signals to carry user data while the modem devices complete the training process. Although CHAP/PAP data is one preferred form of user data, the present invention is not limited to the transmission or exchange of authentication data. In addition, the particular scrambling algorithm may vary from application to application.

In FIG. 5, the dual function signals are represented by the TRN2A/PPP and TRN2D/PPP signals. In this respect, the receiver sections in the modem devices may be trained at an initial data rate during a first time period, e.g., during a data phase one, such that they may seamlessly transfer to operating at a final data rate during a subsequent time period, e.g., during a data phase two. Furthermore, the PPP log-in procedure can be performed at the initial data rate during the first time period rather than after the modem system has been fully initialized.

During the initial data rate period, a task 430 may be performed to enable the APCM and the DPCM to exchange constellation parameters and modulation parameters (represented by the CP and MP signals in FIG. 5) in a suitable manner. Task 430 may be performed in a conventional V.90 manner. These parameters may be utilized by the modem devices during the subsequent data mode. After the training and authentication procedures are completed, the modem system preferably transitions to a full data rate in a seamless manner. A task 432 may be performed to conduct data transmission at the full data rate. This period may be referred to as the data phase two. Once the modem system enters the full data mode, fast startup process 400 ends.

In contrast to the conventional V.90 modem startup summarized in Table 1, a modem system according to the present invention may experience a reduced startup latency, as set forth in Table 2 below. Notably, the startup time summarized in Table 2 is approximately half of the startup time summarized in Table 1. The considerable reduction in startup latency would be desirable in many situations, particularly in the context of a PPP dial-up internet connection using V.90 or legacy 56 kbps modem systems.

TABLE 2

Fast V.90 Modem Startup

| PROTOCOL | OPERATION | TIME (seconds) |
|---|---|---|
| — | Dialing | 1 |
| — | Call Establishment | 1 |
| V.8 bis (abbreviated) | Capabilities Exchange | 1 |
| — | Modified Answer Tone | 1 |
| V.90 Phase 3 + V.42/V.42 bis | Initial APCM Training; Error Correction; Data Compression | 2.5 |
| V.90 Phase 4 + Login | Final APCM Training; Set Power Levels; Constellation Transmission; Username & Password | 2–5 |
| | | TOTAL = 8.5–11.5 |

The techniques of the present invention may be implemented in other contexts to reduce the initialization time associated with reconnects after a line corrupting event or a channel interruption. For example, many telephone customers subscribe to call waiting, caller identification, and other telephony services. However, such services may be disabled or nonfunctional if the telephone line is being utilized for a modem connection. If call waiting is not disabled during a modem connection, then the signal tones may interrupt the modem connection. If the user decides to answer the waiting line, then the off-hook and on-hook flash may cause the modem system to retrain its receivers or prompt a full reconnect procedure.

Rather than perform a time consuming reconnect or retrain procedure, a modem system may be configured to utilize stored analog and digital impairment information, equalizer settings, power levels, echo canceler settings, constellations, and the like. Such stored information can be used to immediately reset the modem system parameters if the channel connection is interrupted by a call waiting procedure, by an off-hook condition at an extension telephone device, by a caller identification request, or by any channel corruption event. In this scenario, both the client modem and the server modem may store the relevant system attributes.

In response to a call waiting tone, the client modem may signal the server to enter a standby mode. The server modem can then switch into an FSK mode to suitably detect the Class 2 caller identification information while the server idles. If the user wants to answer the second call, then the client modem may periodically transmit standby signals or heartbeat tones to the server to instruct the server to continue holding. When the second call ends and the user desires to commence the data call, the client modem would commence a fast reconnect handshaking protocol. On the other hand, if the user wants to terminate the first call, then a clear down message may be sent (alternatively, the periodic hold signal may end).

The fast reconnect handshake causes the modem devices to recall the saved parameters and attributes of the "held" channel. With this technique, the modem system can be reconnected in a matter of seconds. Thus, the data mode user will not suffer the long reconnect penalty after handling an incoming call waiting or caller identification signal. The data mode user, using call waiting in this fashion, would be capable of accepting intermittent interruptions without noticeable delays associated with the modem connection.

This feature may be utilized to simulate an "always connected" mode with conventional PPP modem connections. For example, pertinent channel compensation information may be periodically saved for a given connection between a client modem and a server modem. The client user may answer incoming second line calls while pausing the data mode as described above. In addition, the data mode may be gracefully terminated if the client user initiates an outgoing voice call. After the voice call terminates, the client modem may re-dial the server modem and establish a fast connection using the stored parameters.

In summary, the present invention provides techniques to reduce the initialization period normally associated with a V.90 modem system. The fast startup technique leverages the known channel characteristics of a previous connection to reduce the training time associated with subsequent attempts to establish the same connection. Although not limited to any specific modem application, the fast startup procedure may be used to eliminate portions of the initialization protocols or processes normally employed by a 56 kbps modem, e.g., V.8bis, V.8, digital impairment learning, initial training, probing and ranging, or the like. In addition, the fast startup technique may perform certain operations at a different time or in a different order in comparison to a conventional modem startup technique.

The present invention has been described above with reference to a preferred embodiment. However, those skilled in the art will recognize that changes and modifications may be made to the preferred embodiment without departing from the scope of the present invention. These and other changes or modifications are intended to be included within the scope of the present invention, as expressed in the following claims.

What is claimed is:

1. A method for reducing startup latency associated with a data transmission system having a first device configured to communicate with a second device over a communication channel, said method comprising the steps of:
   establishing a call between said first device and said second device;
   determining whether a characteristic of said communication channel is similar to a corresponding characteristic associated with a previously established communication channel; and
   initializing at least one of said first and second devices using a number of stored parameters associated with said previously established communication channel, said initializing step being performed if said determining step determines that said characteristic is similar to said corresponding characteristic.

2. The method according to claim 1, further comprising the step of ascertaining, for said call, whether said first device and said second device support a fast connect protocol, said ascertaining step being performed prior to said determining and initializing steps.

3. The method according to claim 1, wherein said determining step comprises the steps of:
   transmitting a signal point sequence from said first device to said second device;
   obtaining a received sequence at said second device, said received sequence being related to said signal point sequence; and
   comparing attributes of said received sequence with stored attributes of a previously received sequence associated with said previously established communication channel.

4. The method according to claim 3, wherein said signal point sequence comprises a sequence of pulse code modulation signal points.

5. The method according to claim 3, wherein said signal point sequence is predetermined and known at said first device and at said second device.

6. The method according to claim 1, wherein:
   at least a portion of said initializing step is performed at an initial data rate; and
   said method further comprises the step of entering a data mode at a full data rate, said entering step being performed after said initializing step.

7. The method according to claim 1, further comprising the step of identifying at least one signal point for use by said first device in a transition sequence, said at least one signal point being capable of highlighting the presence of digital impairments in said communication channel.

8. The method according to claim 1, further comprising the steps of:
   conducting final training of at least one of said first and second devices during a time period, said conducting step being performed after said determining step; and exchanging authentication information between said first and second devices during said time period.

9. The method according to claim 8, wherein said exchanging step is performed in accordance with the Password Authentication Protocol ("PAP") or in accordance with the Challenge Handshake Authentication Protocol ("CHAP").

10. The method according to claim 1, wherein said determining step determines whether digital impairments associated with said communication channel are similar to digital impairments associated with said previously established communication channel.

11. A method for reducing startup latency associated with a data transmission system having a first device configured to communicate with a second device over a communication channel, said method comprising the steps of:
   establishing a call between said first device and said second device;
   determining whether a characteristic of said communication channel is similar to a corresponding characteristic associated with a previously established communication channel;
   training at least one of said first and second devices at an initial data rate during a first time period; and
   exchanging authentication information between said first and second devices during said time period, said exchanging step being performed if said determining step determines that said characteristic is similar to said corresponding characteristic.

12. The method according to claim 11, further comprising the step of initializing at least one of said first and second devices in response to a number of stored parameters associated with said previously established communication channel, said initializing step being performed if said determining step determines that said characteristic is similar to said corresponding characteristic.

13. The method according to claim 11, further comprising the step of ascertaining, for said call, whether said first device and said second device support a fast connect protocol, said ascertaining step being performed prior to said determining, training, and exchanging steps.

14. The method according to claim 11, wherein said determining step comprises the steps of:
   transmitting a signal point sequence from said first device to said second device;
   obtaining a received sequence at said second device, said received sequence being related to said signal point sequence; and
   comparing attributes of said received sequence with stored attributes of a previously received sequence associated with said previously established communication channel.

15. The method according to claim 11, further comprising the step of identifying at least one signal point for use by said first device in a transition sequence, said at least one signal point being capable of enabling said second device to detect digital impairments present in said communication channel.

16. The method according to claim 11, wherein said exchanging step is performed in accordance with the Password Authentication Protocol ("PAP") or in accordance with the Challenge Handshake Authentication Protocol ("CHAP").

17. The method according to claim 11, wherein:
   said training step comprises the step of transmitting scrambled digital data between said first and second devices; and
   said authentication information exchanged during said exchanging step is associated with said scrambled digital data.

18. The method according to claim 17, wherein said scrambled digital data comprises said authentication information.

19. The method according to claim 11, wherein said determining step determines whether digital impairments associated with said communication channel are similar to digital impairments associated with said previously established communication channel.

20. A data transmission device comprising:
   a receiver section configured to receive communication signals transmitted by a remote device;
   a transmitter section configured to transmit communication signals to said remote device and to transmit a fast connect identifier in response to the establishment of a call associated with a current communication channel, said current communication channel having a first channel characteristic associated therewith;
   a memory element configured to store a second channel characteristic associated with a previously established communication channel; and
   a processor element configured to determine whether said first channel characteristic is similar to said second channel characteristic, said processor being further configured to trigger a fast startup routine in response to a validation of said first channel characteristic with said second channel characteristic.

21. The device according to claim 20, wherein:
   said receiver section is configured to obtain a received sequence related to a signal point sequence transmitted by said remote device; and
   said processor element is configured to compare attributes of said received sequence with stored attributes of a previously received sequence associated with said previously established communication channel.

22. The device according to claim 20, wherein said transmitter is further configured to transmit a signal point identifier that identifies at least one signal point for use by said remote device in a transition sequence, said at least one signal point being capable of highlighting the presence of digital impairments in said current communication channel.

23. The device according to claim 22, wherein said transmitter is configured to transmit said fast connect identifier and said signal point identifier as one sequence.

24. The device according to claim 20, wherein said receiver is further configured to receive a fast connect acknowledgment from said remote device, said fast connect acknowledgment being generated in response to said fast connect identifier.

25. The device according to claim 20, wherein said processor element is further configured to initialize said receiver section in response to a number of stored parameters associated with said previously established communication channel, wherein an initialization of said receiver section occurs if said processor element determines that said first channel characteristic is similar to said second channel characteristic.

26. The device according to claim 20, wherein said processor element is further configured to train said receiver section at an initial data rate and to exchange authentication information with said remote device during a first time period, wherein an exchange of authentication information with said remote device occurs if said processor element determines that said first channel characteristic is similar to said second channel characteristic.

27. The device according to claim 26, wherein said exchange of authentication information is performed in accordance with the Password Authentication Protocol ("PAP") or in accordance with the Challenge Handshake Authentication Protocol ("CHAP").

28. The device according to claim 26, wherein:
said receiver section is trained in response to scrambled digital data transmitted by said remote device; and
said authentication information is associated with said scrambled digital data.

29. A data transmission device comprising:
a receiver section configured to receive communication signals transmitted by a remote device and to receive a fast connect identifier in response to the establishment of a call associated with a current communication channel, said current communication channel having a first channel characteristic associated therewith;
a transmitter section configured to transmit communication signals to said remote device and to transmit a signal point sequence if said receiver section receives said fast connect identifier, said signal point sequence being configured to identify said first channel characteristic to said remote device; and
a processor element configured to trigger a fast startup routine in response to a validation of similarity between said first channel characteristic and a second channel characteristic associated with a previously established communication channel.

30. The device according to claim 29, wherein said receiver section is further configured to receive a signal point identifier that identifies at least one signal point for use in a transition sequence, said at least one signal point being capable of illuminating digital impairments present in said current communication channel.

31. The device according to claim 29, wherein said transmitter section is further configured to transmit said transition sequence, said transition sequence comprising positive and negative values of said at least one signal point.

32. The device according to claim 29, wherein said signal point sequence transmitted by said transmitter section comprises a sequence of pulse code modulation signal points.

33. The device according to claim 29, wherein:
said transmitter section is further configured to transmit a training sequence to said remote device at an initial data rate during a first time period;
said processor element is further configured to exchange authentication information with said remote device during said first time period; and
an exchange of authentication information with said remote device occurs if said processor element determines that said first channel characteristic is similar to said second channel characteristic.

34. The device according to claim 33, wherein said exchange of authentication information is performed in accordance with the Password Authentication Protocol ("PAP") or in accordance with the Challenge Handshake Authentication Protocol ("CHAP").

* * * * *